United States Patent
Toriumi et al.

(10) Patent No.: US 7,358,289 B2
(45) Date of Patent: Apr. 15, 2008

(54) HEAT-CURABLE ADHESIVE COMPOSITION

(75) Inventors: Naoyuki Toriumi, Sagamihara (JP); Kohichiro Kawate, Machida (JP); Jun Fujita, Inagl (JP); Shigeyoshi Ishii, Hatiouji (JP)

(73) Assignee: 3M Innovative Properties Company, St. Paul, MN (US)

( * ) Notice: Subject to any disclaimer, the term of this patent is extended or adjusted under 35 U.S.C. 154(b) by 439 days.

(21) Appl. No.: 10/532,421

(22) PCT Filed: Sep. 2, 2003

(86) PCT No.: PCT/US03/27671

§ 371 (c)(1),
(2), (4) Date: Apr. 22, 2005

(87) PCT Pub. No.: WO2004/037939

PCT Pub. Date: May 6, 2004

(65) Prior Publication Data

US 2006/0014871 A1    Jan. 19, 2006

(30) Foreign Application Priority Data

Oct. 22, 2002 (JP) .............................. 2002-307222

(51) Int. Cl.
*C08L 93/04* (2006.01)

(52) U.S. Cl. ...................................... 524/272; 524/274

(58) Field of Classification Search ................ 524/270, 524/271, 272, 274
See application file for complete search history.

(56) References Cited

U.S. PATENT DOCUMENTS

| 5,548,012 A | 8/1996 | Yamamoto et al. |
| 6,335,076 B1 | 1/2002 | Nakamura et al. |
| 6,590,070 B1 | 7/2003 | Toriumi et al. |

FOREIGN PATENT DOCUMENTS

| EP | 0 289 632 A1 | 11/1988 |
| EP | 0 348 200 A2 | 12/1989 |
| EP | 0 721 975 A1 | 7/1996 |
| JP | 2-180979 | 7/1990 |
| JP | 2-261876 | 10/1990 |
| JP | 4-8766 | 1/1992 |
| JP | 4-227982 | 8/1992 |
| JP | 5-17735 | 1/1993 |
| JP | 5-295126 | 11/1993 |
| JP | 9-25371 | 1/1997 |
| JP | 10-81815 | 3/1998 |
| JP | 10-316955 | 12/1998 |
| JP | 2000-290627 | 10/2000 |
| WO | WO 00/00566 | 1/2000 |

*Primary Examiner*—Peter Szekely
(74) *Attorney, Agent, or Firm*—Dean M. Harts; Yen T. Florczak

(57) ABSTRACT

The present invention provides a heat-curable adhesive composition comprising ethylene-glycidyl (meth)acrylate copolymer, low density polyethylene, ethylene-a-olefin copolymer, and a heat curing agent for the ethylene-glycidyl (meth)acrylate copolymer.

8 Claims, 1 Drawing Sheet

HEAT-CURABLE ADHESIVE COMPOSITION

FIELD OF THE INVENTION

The present invention relates to a heat-curable adhesive composition, and more particularly to a heat-curable adhesive composition that has excellent heat resistance, excellent electrical properties (e.g., low dielectric constant and low dielectric loss tangent), excellent adhesive strength, and of sustaining high adhesive strength when used continuously for a long period under a high temperature environment. The heat-curable adhesive composition of the present invention can be advantageously used as a film adhesive in the manufacture of an electronic apparatus such as a semiconductor apparatus.

BACKGROUND

Adhesives having a polyethylene polymer (including polyethylene copolymer) as a main component have been known as a type of the so-called hot-melt adhesives that permit heat bonding, and have been used mainly in the manufacture of electronic apparatuses. These polyethylene adhesives are chemically stable. Their stability has been proved in tests under severe conditions such as Pressure Cooker Test. As an example of such an adhesive, a hot-melt adhesive comprising an ethylene-glycidyl methacrylate copolymer as a polyethylene polymer, and rosin, is described Japanese Unexamined Patent Publication (Kokai) No. 9-25371 (Claims). In this adhesive, the rosin is added as a tackifier which, together with the polar action of glycidyl group in ethylene-glycidyl methacrylate copolymer, enhance adhesion to metallic surfaces. In this adhesive, the heat curing reaction of the rosin and the ethylene-glycidyl methacrylate copolymer is not positively used.

This adhesive can be used as to secure the lead pin of a lead frame of an integrated circuit. After heat bonding the adhesive, it is immersed in a solder bath, and thereafter is left in a high temperature environment (at 230° to 260° C.) for a long period and then used. Therefore, high heat resistance is required for this adhesive. However, above-mentioned patent publication contains no specific teaching regarding improvement of heat resistance.

To increase heat resistance, it maybe advantageous to increase reactivity of the hot-melt adhesive, and the so-called reactive (curing) hot-melt adhesive in which cross linking reaction after adhesion (post-cure) is made possible has been known. For example, Japanese Unexamined Patent Publication (Kokai) No. 5-295126, a silanol condensation type hot-melt adhesive is disclosed where an olefin having silyl group is used for post-cure cross-linking of polyolefin. A moisture curable type hot-melt adhesive is also known which has ethylene copolymer blended with urethane polymer (see Japanese Unexamined Patent Publication (Kokai) No. 4-8786). However, because moisture is needed for cross-linking this material, it is not suited to application to the manufacture of IC packages.

An adhesive polyolefin is known where a polar component such as vinyl acetate, ethylene acrylate, maleic acid, styrene, is introduced by copolymerization into polyolefin to increase adhesive strength (see Japanese Unexamined Patent Publication (Kokai) No. 5-17735, Japanese Unexamined Patent Publication (Kokai) No. 4-227982, Japanese Unexamined Patent Publication (Kokai) No. 2-261876, Japanese Unexamined Patent Publication (Kokai) No. 2-255884, Japanese Unexamined Patent Publication (Kokai) No. 2-180979)7. However, such a polyolefin has very low heat resistance, and amount of polar groups (reactive functional groups) in the polyolefin molecule needs to be increased to obtain sufficient adhesive strength.

As a heat resistant adhesive containing polyethylene, polyethylene blended with epoxy resin and a latent curing agent is known (see Japanese Unexamined Patent Publication (Kokai) No. 63-301283).

Further, an adhesive composition capable of being used in hot-melt condition comprising (a) ethylene-glycidyl (meth) acrylate copolymer as a first polyethylene polymer, (b) ethylene-alkyl (meth)acrylate copolymer as a second polyethylene polymer, and (c) rosin having carboxyl group in the molecule, wherein cross-linking structure is formed between ethylene units in above-mentioned copolymers is also known (see Japanese Unexamined Patent Publication (Kokai) No. 10-316955). The cross-linking structure can be formed by irradiating electron beam to the mixture containing above-mentioned components (a) to (c). With this composition, problems associated with conventional reactive (curing) hot-melt adhesive such as slow cross-linking reaction, gradual deterioration of adhesive strength due to generation of reaction by-product, gelation during heating, etc., can be overcome. It is also advantageous in that it can be formed into film-like adhesive without using solvent.

SUMMARY

In recent years, with increasingly higher clock frequency and higher integration of a semiconductor chip, adhesives for IC package having excellent electrical properties, that is, having low dielectric constant and low dielectric loss (low dielectric loss tangent, tanδ), are needed.

Ethylene homopolymer is characterized by low dielectric constant, but does not exhibit sufficient adhesive strength and heat resistance. To improve adhesive strength and heat resistance, polyethylene polymer having polar groups (including reactive group) added to the molecule (copolymer having ethylene unit and other polymerization unit) is used. To realize sufficient adhesive strength and heat resistance, however, the amount of polar groups in the polyolefin molecule needs to be increased with the result that dielectric constant and dielectric loss tangent are inevitably increased. When an epoxy resin is used, dielectric constant is increased due to the aromatic component derived from the epoxy resin.

When a heat-curable adhesive is used in the manufacture of electronic apparatuses, various properties are desired other than the above-mentioned adhesive strength, heat resistance, and electrical properties. For example, chemical stability, low hygroscopicity, low ionic contamination, heat resistance to reflow process, are some typical properties desired for such adhesives.

With the migration toward smaller, thinner and more light-weight apparatuses, these adhesives can be preferably used in the form of a thin film or coating less than 100 μm in thickness. In other words, it is desirable that the adhesive can be used as a film adhesive.

In addition, it is desirable for the adhesive to sustain high adhesive strength when it is used continuously for a long period under a high temperature environment.

In one aspect, the present invention provides a heat-curable adhesive composition that has low dielectric constant and low dielectric loss tangent. The adhesive can be post-cured and contains polyethylene polymer.

In another aspect, the present invention provides a heat-curable adhesive composition that exhibits excellent heat resistance, chemical stability, low hygroscopicity, low ion contamination, and heat resistance to reflow process.

In another aspect, the present invention provides a heat-curable adhesive composition that can be used in the form of thin film or film.

In another aspect, the present invention provides a heat-curable adhesive composition that exhibits high adhesive strength not only at an early stage, but can sustain its high adhesive strength when used continuously for a long period under a high temperature environment.

The adhesive composition can advantageously be used in the manufacture of various electronic apparatuses such as semiconductor apparatus or other apparatuses, e.g., high frequency IC package and printed circuit board.

Further, this adhesive composition not only exhibits high initial adhesive strength, but also can sustain its high adhesive strength even when it is continuously used under high temperature environment for a long time.

BRIEF DESCRIPTION OF DRAWING

The present invention can be further described by the drawings wherein.

DETAILED DESCRIPTION

Figure 1:
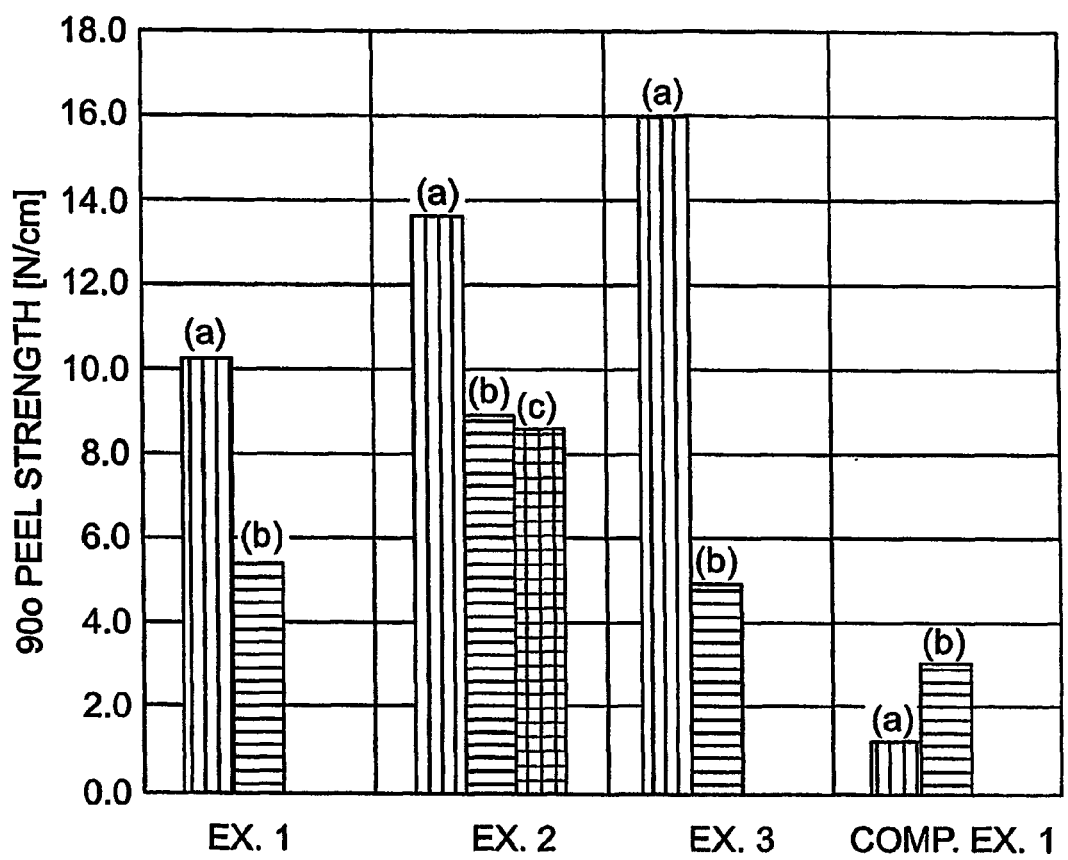
FIG. 1 is a graph plotting the measurement result of adhesive strength in the examples.

In this Detailed Description and the Examples, all numbers are assumed to be modified by the term "about."

In accordance with one aspect of the present invention, a heat-curable adhesive composition is provided that comprises in combination, an ethylene-glycidyl (meth)acrylate copolymer, a low density polyethylene, an ethylene-α-olefin copolymer, and a heat curing agent for the ethylene-glycidyl (meth) acrylate copolymer.

As has been described above, various heat bonding type polyethylene heat-curable adhesives are known and have been used mainly in the manufacture of electronic apparatuses.

For example, a heat-curable adhesive composition as disclosed in Japanese Unexamined Patent Publication (Kokai) No. 2000-290627 comprises (a) a first polyethylene polymer having epoxy group in the molecule, (b) a second polyethylene polymer having no epoxy group in the molecule, including ethylene homopolymer, and (c) a heat curing agent for the first polyethylene polymer (rosin containing carboxyl group in the molecule). By combining components (a) to (c), this adhesive composition has the effect of lowering dielectric constant and dielectric loss tangent, and also increasing adhesive strength and heat resistance by post-cure.

Another heat-curable adhesive that, as of the filing date of the application, has not yet been publicly disclosed in the Patent Gazettes comprises (a) polyolefin, (b) ethylene-glycidyl (meth)acrylate copolymer, and (c) a heat curing agent for above-mentioned ethylene-glycidyl (meth)acrylate copolymer (preferably rosin having carboxyl group in the molecule). By combining components (a) to (c), this adhesive composition has the effect of providing low toxicity, low dielectric constant, and excellent heat resistance and oxidation stability, and also of increasing adhesive strength and heat resistance by post-cure.

These two preceding heat-curable adhesive compositions provide satisfactory electrical properties (in particular, dielectric constant and dielectric loss tangent), adhesive strength and heat resistance. In the case of the first adhesive composition, however, although it is disclosed as suitable for a film adhesive of 0.001 to 5 mm, thickness of 100 μm as set forth in Examples 1 to 9 is generally adopted. It is desirable to provide the first adhesive in the form of a film adhesive of smaller thickness.

In the case of the second adhesive composition, although it exhibits satisfactory adhesive strength under ordinary use, the adhesive strength tends to become insufficient when used for a long period under a high temperature condition of 100° C. or higher.

In contrast to the two preceding adhesive compositions, the heat-curable adhesive composition of the present invention comprises the following four components in combination:

(1) ethylene-glycidyl (meth)acrylate copolymer, (2) low density polyethylene, (3) ethylene-α-olefin copolymer, and (4) heat curing agent for said ethylene-glycidyl (meth) acrylate copolymer.

Each of these components and its function will be described in detail later, and only brief description is given here. In the adhesive composition of the present invention, inclusion of the components (1) and (4), has the various effects which are derived from the use of polyethylene material, such as chemical stability, low hygroscopicity, and low ion contamination. In addition, inclusion of components (2) and (3) has the effect of notably improving electrical properties (dielectric constant and dielectric loss tangent). Thus, even when the composition is used in thickness of 80 μm or less, various excellent characteristics are not adversely affected, and when used in a high temperature environment of 100° C. or higher, high adhesive strength can be stably obtained not only in initial stage, but also after prolonged continuous use.

Ethylene-glycidyl (meth)acrylate copolymer used as the first component in the heat-curable adhesive composition of the present invention is a copolymer of ethylene and glycidyl (meth)acrylate, that is, glycidyl acrylate or glycidyl methacrylate. In this copolymer, the ethylene unit provides many notable operative effects derived from its ethylene structure such as chemical stability, low hygroscopicity, low ion contamination, low dielectric constant, low dielectric loss tangent, moldability at low temperature, heat bonding performance, radiation induced cross-linking, etc. The glycidyl (meth)acrylate unit copolymerized with the ethylene unit can react, when the adhesive composition is heated to a predetermined temperature, with the heat curing agent (preferably rosin, as described below) used in conjunction with this component to increase the cohesive force of the hardened product. Such a high cohesive force is advantageous for improving adhesive performance such as the peel strength. By irradiation with electron beam, cross-linking structure can be formed between molecules of ethylene-glycidyl (meth)acrylate copolymer and/or between molecules of low density polyethylene used in conjunction with it, thereby improving the elastic modulus at the time of heat bonding of the adhesive composition. The ethylene-glycidyl (meth)acrylate copolymer serves to melt the adhesive composition at relatively low temperature, thereby simplifying hot-melt coating. It also serves to give good heat adhesion property (good adhesion to the adherend when the composition is cooled and solidified after being melted and brought into close contact with the adherend) to the adhesive composition.

Ethylene-glycidyl (meth)acrylate copolymer can cause the heat-curable adhesive composition to melt at relatively low temperature. Melt flow rate (MFR: g/10 minutes) of the copolymer as measured at 190° C. in accordance with test method JIS K 6760 is typically not less than 1 (g/10 minutes), preferably not less than 10, and more preferably not less than 30. With MFR in this range, melt coating of the heat-curable adhesive composition can be easily performed. However, for larger value of MFR, cohesive force of the hardened heat-curable adhesive composition tends to be lowered. Therefore, the minimum MFR 50 and the maximum is 500 (g/10 minutes). In other words, it is desirable that the molecular weight of ethylene-glycidyl (meth)acrylate copolymer (weight averaged molecular weight) be selected suitably so as to bring the value of MFR into above-described range.

Ethylene-glycidyl (meth)acrylate copolymer can be prepared, for example, by using a monomer mixture containing (i) glycidyl (meth)acrylate monomer and (ii) ethylene monomer as starting material, and by polymerization under a predetermined condition. In addition to these monomers, monomers such as propylene, alkyl (meth)acrylate, vinyl acetate may be used as a third monomer as long as the operative effect of the present invention is not adversely affected. In such a case, the minimum carbon number of alkyl group in the alkyl (meth)acrylate is 1 and the maximum is 8.

Specific example of ethylene-glycidyl (meth)acrylate copolymer includes, but is not limited to, 1) binary copolymer of ethylene and glycidyl (meth)acrylate, 2) ternary copolymer of ethylene, glycidyl (meth)acrylate, and vinyl acetate, 3) ternary copolymer of ethylene, glycidyl (meth) acrylate, and alkyl (meth)acrylate. These copolymers may be used individually, or in combination of two or more of them.

In the ethylene-glycidyl (meth)acrylate copolymer, proprtion of the repeating unit formed by polymerization of monomer mixture of ethylene and glycidyl (meth)acrylate is, relative to the total weight of the copolymer, typically about 50% by weight, preferably 75% by weight or more. In the above-mentioned repeating unit, the weight ratio (G:E) of glycidyl (meth)acrylate (G) to ethylene (E) is 50:50 to is 1:99. In a particularly suited embodiment, the weight ratio is 20:80 to 5:95. If ethylene content is too small, cosolubility of the copolymer to the low density polyethylene or rosin that are used in conjunction with the copolymer may be lowered, and homogeneous composition may not be formed, and formation of cross-linking by electron beam irradiation may become difficult. If the content of ethylene is too large, the adhesion performance may be lowered.

The ethylene-glycidyl (meth)acrylate copolymer may be used in various amount in the adhesive composition. The minimum amount of the ethylene-glycidyl (meth)acrylate copolymer used is, relative to the total weight of the adhesive composition, is 20% and the maximum is 50% by weight. In a particularly suited embodiment, the minimum amount is 25% and the maximum amount is 40% by weight. If the amount of this copolymer is less than 20% by weight, heat curing performance may be degraded. If the amount of this copolymer is more than 50% by weight, it may be difficult to obtain sufficiently low dielectric constant and dielectric loss tangent.

The low density polyethylene (LDPE), used as a second component, provides the above-described operative effect derived from ethylene to the adhesive composition. It also lowers the hygroscopicity, dielectric constant and dielectric loss tangent further than the ethylene-glycidyl (meth)acrylate copolymer, and in addition, gives high adhesive strength when the adhesive is used continuously for a long period at high temperature. Mechanism has not been clarified regarding improvement of adhesive strength at high temperature. Branch structure is not frequent in the molecule of low density polyethylene, and it may be a factor for ensuring chemically stable state against deterioration due to oxidation at high temperature.

The density of the LDPE used as a second component in the adhesive composition may be arbitrarily varied within the range recognized in the field of polymer chemistry. In one embodiment, the minimum density is 0.910 and the maximum is 0.925 when measured in accordance with the ASTM D1248-84 test method.

The LDPE has MFR as measured at 190° C. using the JIS K6760 test method of typically not less than 1 (g/10 minutes), preferably not less than 10, and more preferably not less than 30. In a particularly suited embodiment, the minimum MFR is 35 and the maximum is 1,000. It is desirable to avoid too large value of MFR, because cohesive force of hardened composition may be degraded. In other words, it is desirable that the molecular weight of the LDPE (weight average molecular weight) be suitably selected so as to bring the value of MFR in the above-described range.

The LDPE is used alone as a second component in the composition, but medium density polyethylene (MDPE) and high density polyethylene (HDPE) may be used in conjunction with it as long as the operative effect of the present invention is not adversely affected. By adding these polyethylenes, hardness of the adhesive composition can be effectively increased, and dimensional stability and the like of IC package, etc., produced by applying the adhesive composition of the present invention may be improved.

The LDPE may be used in various amounts in the heat-curable adhesive composition. The minimum amount of the LDPE used is, relative to the total amount of the adhesive composition, is 15% and the maximum is 50% by weight. In a particularly suited embodiment, the minimum is 25% and the maximum is 40% by weight. If the amount of LDPE is less than 15% by weight, high adhesive strength cannot be obtained when used continuously for a long period at high temperature. The amount is more than 50% by weight, high initial adhesive strength may not be obtained.

The ethylene-α-olefin copolymer used as a third component, not only provides the above described operative effect derived from the ethylene structure to the adhesive composition, but also effectively lowers hygroscopicity, dielectric constant and dielectric loss tangent further than the ethylene glycidyl (meth) acrylate copolymer. The ethylene-alpha-olefin copolymer also gives high initial adhesive strength to the adhesive composition even when it is in the form of thin film or film of 80 μm or less in thickness. High adhesive strength in the form of thin film or the like may be attributed to the α-olefin unit of this copolymer, because α-olefin typically has low glass transition temperature (Tg), and low crystallinity, and thus is elastomeric at ordinary temperature. When this copolymer is dispersed somewhat unevenly in the adhesive composition, high adhesive strength is thought to be developed in a mechanism similar to toughening effect of rubber dispersion phase in a heat-curable resin. In the ethylene-α-olefin copolymer, the ethylene unit together with the dispersed α-olefin unit is thought to be capable of exhibiting the effect of increasing the interaction at the interface with the ethylene-glycidyl (meth)acrylate copolymer or with the low density polyethylene.

The ethylene-α-olefin copolymer may be prepared by copolymerizing ethylene and α-olefin under suitable polymerization condition. Copolymerization ratio of ethylene and α-olefin may be varied widely and typically in the range of 90:10 to 10:90. The minimum density of the ethylene-α- olefin copolymer thus obtained is, when measured according to ASTM D1248-84 test method, 0.85 and the maximum is 0.909. In a particularly suited embodiment, the minimum density is 0.850 and the maximum is 0.890.

The ethylene-α-olefin copolymer has MFR as measured at 190° C. in accordance with test method JIS K6760, typically of not less than 1 (g/10 minutes), preferably of not less than 5, and more preferably of not less than 10. In a particularly suited embodiment, the minimum MFR is 20 and the maximum is 1,000. It is desirable to avoid too large MFR, because cohesive force of the hardened composition may be lowered. In other words, it is desirable that the molecular weight of the ethylene-α-olefin copolymer (weight average molecular weight) be suitably selected so as to bring the value of MFR in the above-described range.

Type of α-olefin used in the ethylene-α-olefin copolymer is not particularly limited, but is advantageously at least one α-olefin selected from the group consisting of 1-butene, 1-pentene, 4-metyl-1-pentene, 1-heptene, 1-octene, 1-nonene, 1-decene, 1-undecene, and 1-dodecene.

These ethylene-α-olefin copolymers may be used in the heat-curable adhesive composition in various amounts. The minimum amount of ethylene-α-olefin copolymer used is, relative to the total amount of the adhesive composition, 15% and the maximum is 50% by weight. In a particularly suited embodiment, the minimum is 25% and the maximum is 40% by weight. If amount of the ethylene-α-olefin copolymer is less than 15% by weight, initial adhesive strength may be insufficient. If the amount is more than 50% by weight, the adhesive strength when used continuously for a long period under high temperature may be degraded.

The heat curing agent, used as a fourth component, is not particularly limited as long as the compound functions advantageously as a heat curing agent for the ethylene-glycidyl (meth)acrylate copolymer. Various heat curing agent known in the field of polymer chemistry can be used. A suitable heat curing agent is a rosin that has a polar group such as carboxyl group in the molecule.

Rosin that can be advantageously used as a heat curing agent has carboxyl group in the molecule, and can react with the ethylene-glycidyl (meth)acrylate copolymer to heat-cure the adhesive composition to obtain improved adhesive performance. Typical example of rosin includes, but is not limited to, gum rosin, wood rosin, tall oil rosin, or chemical modification thereof (for example, polymerized rosin). The minimum acid value of these rosins is 100 and the maximum is 300. In a particularly suited embodiment, the minimum is 150 and the maximum is 250. If acid value is too low, reactivity with the ethylene-glycidyl (meth)acrylate copolymer is lowered, and hardening of the composition may be degraded. The acid value is too high, stability during molding by heat (prevention of viscosity increase) may be lowered. As used herein, "acid value" means the amount of potassium hydroxide expressed in mg required to neutralize 1 g of sample.

The minimum softening point of the rosin used in the adhesive composition of the present invention is 50 ° and the maximum is 200° C. In a particularly suited embodiment, the minimum is 70° and the maximum is 150° C. If the softening point is too low, reaction with the ethylene-glycidyl (meth)acrylate copolymer may take place during storage, and storage stability may be degraded. If the softening point is too high, reactivity with the ethylene-glycidyl (meth)acrylate copolymer is lowered, and hardening of the composition may become insufficient. As used herein, "softening point" means the value measured in accordance with test method JIS K 6730.

Rosin may be used in various amounts in the heat-curable adhesive composition. The minimum amount of rosin used is, relative to total amount of the adhesive composition, 0.5% and the maximum is 10% by weight. In a particularly suited embodiment, the minimum is 1% and the maximum is 5% by weight. If the amount of rosin is less than 0.5% by weight, hardening of the adhesive composition may become insufficient. If the amount of rosin is more than 10% by weight, it is difficult to obtain low dielectric constant and low dielectric loss tangent. Rosins may be used individually, or in combination of two or more of them. Carboxyl group to be contained in the molecule of rosin may include, in addition to carboxyl group per se, carboxyl group that may be generated from acid anhydride under the influence of heat or moisture. Rosin having substantially no carboxyl group in the molecule may be used in the adhesive composition as long as effect of the present invention is not adversely affected.

The heat-curable adhesive composition of the present invention may optionally contain, in addition to the above-described first to fourth components, one or more additives. Suitable additives include, but are not limited to, antioxidant, UV absorbent, metal deactivator, filler (for example, inorganic colloid, polymer particles, conductive particles, pigment, etc.), lubricant (for example, wax, etc.), rubber component, tackifier, curing assistant.

For example, inorganic colloid is contained in the dispersion medium usually in the form of colloid particles and does not precipitate under the action of gravity and remains stably dispersed. Therefore, the adhesive composition formed by drying such dispersion medium contains various components in a substantially uniformly mixed state, and increased flow resistance during hot-press bonding and increased solder heat resistance can be realized very easily. Content of inorganic colloid is not particularly limited as long as the effect of the present invention is not impaired. Typically, the minimum content is 2% and the maximum is 30% by weight. If the content is less than 2% by weight, dimensional stability may be degraded. If the content is more than 30% by weight, peeling strength may be lowered. As used herein, "inorganic colloid" means fine particles having average particle diameter typically in the range of 1 to 100 nm. For example, inorganic particle sol can be mixed with adhesive component, and is contained as dispersed phase in the adhesive component. Inorganic particle sol is usually a mixture of (a) dispersion medium and (b) inorganic colloid dispersed in the dispersion medium.

Silica colloid may be advantageously used as the inorganic colloid. It effectively increases flow resistance during hot-press bonding and solder heat resistance. On the other hand, inorganic colloid may be used advantageously when it is surface treated with a suitable surface treatment agent. Improvement of solder heat resistance and improvement of flow characteristics of the adhesive during hot-press bonding (increase of flow resistance) can be thus realized effectively. Surface modifier such as organic silicon compounds, organic titanate can be used as suitable surface treatment agents. Suitable organic silicon compounds include alkylchlorosilane, alkylalkoxysilane, polydimethyl siloxane, alkyl disilazane, aminosilane, thiol silane, epoxy silane, urea silane. These organic silicon compounds may be used individually or may be used in combination of two or more of them. Especially suitable organic silicon compound is alkyldisilazane, which has especially excellent solder heat resistance, and allows an adhesive of level 1, that is, the highest level of the solder heat resistance standard of JEDEC (Joint Electronic Device Engineering council (Japan)), to be formed.

Surface treatment of inorganic colloid is usually performed by adding a surface treatment agent to a dispersion medium having particles dispersed therein, and by further dispersing the particles. The dispersion medium after the surface treatment can be used as a sol containing colloid particles having their surface treated. It is also possible, after the dispersion medium is dried, and is subjected to crushing operation if necessary, to obtain particles as a powder with their surface treated. The minimum amount of the surface treatment agent is, for 100 parts by weight of inorganic colloid, 0.001 and the maximum is 30 parts by weight.

The first to fourth components are used in an amount in the above-described range. Furthermore the first, second and third components are used such that the sum of the amount of these three components is, relative to the total amount of the adhesive composition, not less than about 80% by weight, and more preferably not less than about 90% by weight.

The heat-curable adhesive composition provides a heat-curable adhesive. This adhesive is solid at ordinary temperature (25° C.), and permits hot-press bonding to be performed at a predetermined temperature, under relatively low pressure and in short time (for example, 100 to 200° C., 0.1 to 10 kg/cm$^2$, and 0.1 to 30 seconds), capable of being hardened (cross-linked) by heating during pressing or heating after pressing (post-cure). Therefore, it can be used effectively as a heat-adherent and heat cross-linking type adhesive. This adhesive has, at 1 GHz after post-cure, dielectric constant of 2.5 or less and dielectric loss tangent of 0.015 or less.

The heat-curable adhesive of the present invention is generally heat-cured after being applied to an adherend. If necessary, in combination with the heat curing processing, preliminary curing may be performed by irradiation of radiation before or after being applied to the adherend. The preliminary curing is particularly effective in preventing of overflow during adhesion or in preventing deterioration of adhesive strength due to phase separation during heat curing. Type of the radiation used in the preliminary curing is not particularly limited, and electron beam, ultraviolet radiation, gamma radiation or the like may be used. When the preliminary curing by means of radiation is used in conjunction with heat curing, additives such as photo reaction initiator, photosensitizer, or the like may be added to the adhesive composition as long as the effect of the present invention is not be adversely affected. These additives can be effective in improving the irradiation efficiency. By the preliminary curing processing, interaction of ethylene units contained in the components of the adhesive composition is considered to be radically activated, so that cross-linking reaction between ethylene units proceeds to prevent overflow of the adhesive or phase separation.

More specifically, above-described heat-curable adhesive may be formed by irradiating the adhesive composition, for example, with electron beam to introduce cross-linking structure between ethylene units. In this case, in contrast to conventional radiation curing type, the adhesive may be disposed at the location in an adherend where irradiation with radiation is not possible or is difficult, and then cross-linking can be completed by application of heat. Heating temperature for performing heat curing is typically 120° C. or higher, and heating time is typically 1 minute or longer.

The adhesive composition of the present invention melts at lower temperature (for example, not higher than 120° C.) compared to ordinary hot-melt composition such as hot-melt adhesive, and hot-melt coating may be performed easily. Fluidity at the time of hot-melt is relatively high so that no solvent is required for coating or forming into a film. Thus, no adverse effect arises from solvent left after completion of adhesion. A heat-curable film adhesive can be formed.

In the adhesive composition of the present invention, curing reaction of ethylene-glycidyl (meth)acrylate with rosin at the heating temperature at the time of melt coating or extrusion molding is quite mild, and gelation of the adhesive composition does not take place and its viscosity (complex elastic modulus) does not rise up to level at which continuous production is made difficult. At temperature lower than 90° C., curing reaction substantially stops so that stability in storage of the adhesive composition is very high. In heating and molding process to form it into a predetermined shape such as film, gelation of the adhesive composition is effectively prevented so that continuous production can be easily achieved. At a temperature of 130° C. or higher, even 150° C. or higher, curing reaction proceeds rapidly so that time for heat curing process including post-cure can be shortened easily.

In addition to above-described heat hardening, if the adhesive composition of the present invention further comprises inorganic colloid dispersed in the adhesive components, flow resistance during hot-pressing is further increased. Thus, the adhesive formed from the adhesive component of the present invention can be used as a heat-curable and heat bonding type adhesive having large flow resistance during hot-pressing and high heat resistance.

The adhesive of the present invention is advantageously formed using above-described adhesive composition and introducing cross-linking structure between ethylene units of polyethylene polymer and copolymer molecules contained in the above adhesive components. Such cross-linking structure serves to effectively prevent macroscopic phase separation at the time of heat curing. The cross-linking structure also serves to improve elastic modulus during hot-pressing of the adhesive. By improvement of elastic modulus, excessive fluidity of adhesive layer sandwiched between two adherends during hot-pressing operation can be avoided, and overflow of adhesive from between adherends and degradation of adhesive performance due to small thickness of the adhesive layer can be effectively prevented.

It is desirable to define the elastic modulus of the adhesive that controls the performance as described above, as the storage elastic modulus (G') at 250° C. However, the adhesive of the present invention usually does not exhibit a definite elastic modulus at above-mentioned measurement temperature since curing reaction proceeds by heating. Therefore, the storage elastic modulus of the adhesive will be defined as follows. An adhesive prior to use (prior to application to adherend, for example prior to hot-pressing) is prepared as a sample, and using a dynamic viscoelasticity measuring apparatus, temperature of the sample is raised from 90° C. to 300° C. at rising rate of 5° C./minute, while the storage elastic modulus is being measured at shear velocity of 6.28 rad/sec. The value of elastic modulus measured at 250° C. is defined as "storage elastic modulus at 250° C."

The minimum storage elastic modulus of the adhesive of the present invention as defined above is typically $1 \times 10^3$ and the maximum is $1 \times 10^7$ Pa. In a particularly suited embodiment, the minimum is $2 \times 10^3$ and the maximum is $1 \times 10^6$ Pa. If the storage elastic modulus is too small, flow prevention effect during hot-pressing operation is lowered. If, on the contrary, the storage elastic modulus is too large, adhesion (provisional adhesion) in an instantaneous hot-pressing operation (for example, within 30 seconds or shorter) may turn out to be a failure. If such a provisional adhesion fails, bonded parts may fall off from base material when the bonded parts are conveyed for post-processing (for example, for post-cure processing).

Molecular cross-linking between molecules usually takes place as at least one of cross-linking reactions between ethylene-glycidyl (meth)acrylate copolymer molecules, between low density polyethylene molecules, and between ethylene-glycidyl (meth)acrylate copolymer molecule and low density polyethylene molecule, and cross-linking bond is formed between ethylene units. Such a molecular cross-linking bond is formed, for example, by radically activating ethylene units of the polyethylene polymer and copolymer molecules by irradiation with electron beam for inducing cross-linking reaction between ethylene units to proceed.

The adhesive of the present invention may be produced by molding the adhesive composition into a film or other shape, and by irradiating the molding with electron beam to thereby form cross-linking structure between molecules of polyethylene polymers. The adhesive of the present invention may be produced, for example, by the following method. First, a master batch containing ethylene-glycidyl (meth)acrylate copolymer, low density polyethylene and ethylene-α-olefin copolymer, is prepared. The master batch is usually prepared using a kneading apparatus such as an extruder capable of heating. The master batch is formed usually in pellet-shape to simplify subsequent kneading process. Above-described polymer and copolymer may be used in total amount to be contained in the final adhesive composition to prepare the master batch, or a part of the polymer and copolymer may be used. If additives such as inorganic colloid is to be added, they are preferably kneaded into the master batch in advance. Then, the master batch pellet is charged into a kneading apparatus such as an extruder, a heat curing agent (preferably rosin) melted by heating is added while kneading the charged master batch to obtain an adhesive composition in which all components are homogeneously mixed. The adhesive composition thus obtained is formed in film-shape using application method such as T-die coating, etc. The formed film is irradiated with electron beam to introduce cross-linking structure between molecules of above-mentioned polymer and copolymer and therby to obtain the film-shape adhesive of the present invention.

The adhesive composition of the present invention preferably provides a thin film or film-shape adhesive of less than 100 μm in thickness, that is, a film adhesive. The film adhesive derived from the adhesive composition of the present invention is an advantageous form of usage as heat-bonding type adhesive material which also overcomes above-described problem with conventional hot-melt adhesive at the same time. This film adhesive is easily adhered by heat, for example, simply by sandwiching it between two adherends and performing hot-pressing at a predetermined temperature, and by further subjecting it to post-cure processing at specified temperature for specified time, it exhibits excellent adhesive performance. Heat curing reaction proceeds at temperature of 120° C. and higher, and sufficient adhesive strength (for example, 4 to 15 kg/25 mm or greater) can be obtained by heating (heating during hot-pressing or during post-cure) for 1 minute to 24 hours. Although reaction rate is small for curing reaction at 120° C., desired adhesive performance can be obtained by heating for sufficiently long time (for example, 10 hours or more). In order to shorten the curing time, heating is performed at temperature in the range of 130 to 300° C.

The film adhesive may be produced, for example, as follows. First, the adhesive composition of the present invention containing above-described various components is prepared. Next, the adhesive component is applied by melt coating to a base material such as release paper (liner and the like) to form film-shaped adhesive composition. Finally, the film-shaped adhesive composition is irradiated with electron beam to form cross-linking structure between molecules of the polymer and copolymer containing ethylene units to obtain a film adhesive consisting of the adhesive composition of the present invention. Preparation of adhesive composition for producing the adhesive of the present invention is usually done using a kneading or mixing apparatus, in which various components that constitute the starting material are substantially uniformly mixed. A kneader, roll mill, extruder, planetary mixer, homo-mixer, or the like may be used for this purpose. Mixing temperature and mixing time are selected such that reaction of ethylene-glycidyl (meth)acrylate copolymer with rosin does not substantially proceed. Thus, mixing is usually performed at temperature in the range of 20° to 120° C. for 1 minute to 2 hours.

The minimum complex viscosity η* of the adhesive composition as measured at 120° C. and 6.28 rad/second is preferably 500 and the maximum is 1,000,000 poise. In a particularly suited embodiment, the minimum is 1,200 and the maximum is 10,000 poise. If the complex viscosity η* is too low, forming (including coating) into a predetermined thickness may become difficult. If, on the contrary, the complex viscosity is too high, continuous forming may become difficult.

Melt coating is usually performed at a minimum temperature of 60° and a maximum of 120° C. Ordinary application means, such as knife coater or die coater, are used for coating. Extrusion method may be used for forming film-shaped adhesive composition without using base material. Electron beam irradiation is performed using an electron beam accelerator with a minimum accelerating voltage of 150 and a maximum of 500 kV and a minimum irradiation dose of 10 and a maximum of 400 kGy.

Thickness of the film adhesive is preferably less than 100 μm, and more preferably in the range of 5 to 80 μm. The film adhesive of the present invention can be used satisfactorily in the form of such a thin film. The characteristics and reliability as an adhesive are generally not impaired, and the adhesive may be used in thickness of 100 μm or greater, if necessary.

Usually, one or both of adherent surfaces of the film adhesive is protected with liner to form a product. If adhesion of the adherent surface is relatively low, the adhesive may be provided as a product without liner. A film adhesive with liner can be used, for example, as follows. First, liner is removed from the adhesive film with liner, and the adhesive film is sandwiched between a first adherend and a second adherend. Thus, a laminate is formed having the first adherend, film adhesive, and the second adherend laminated in this order. Then, hot-pressing operation is performed on the laminate at temperature in the range of 80° to 300° C. and pressure in the range of 0.1 to 100 kg/cm², to form adhesion structure consisting of the three layers closely adhered to each other. With this method, two adherend can be adhered to each other with sufficient adhesive strength in 0.1 to 30 seconds.

It is to be understood that the film adhesive of the present invention exhibits sufficient adhesive strength by hot-pressing as described above. And in order to further enhancing the adhesive strength, post-cure processing is performed. Thus, in the above-described adhesion method, post-cure processing is performed on the adhesion structure at temperature typically of 120° C. or higher, preferably in the range of 130° to 300° C., for a period of 1 minute to 24 hours. In order to reduce post-cure processing time, particularly advantageous condition is 140° to 200° C. for 30 minutes to 3 hours. This method is a very useful embodiment of the adhesion method using the film adhesive of the present invention. In place of above-described film adhesive, it is also possible to apply the adhesive composition directly to one of the surfaces of the first and second adherends, and to irradiate it with electron beam to form a layer of adhesive composition, and then to form the adhesion structure as described above.

The adhesive composition or the film adhesive of the present invention can be used with particular advantage in the manufacture of IC package such as electronic components for bonding of IC parts to the printed circuit board. In addition, it can also be used advantageously for adhesion of polymer adherend such as fluoropolymer, polyamide, polyimide, polyetherimide, polycarbonate, polyethylene, polypropylene, polyester, epoxy resin, to each other, or adhesion of polymer adherend to articles formed of other materials (fiber, metal, semiconductor such as silicon, ceramics, glass, etc.). Specific examples of metal include copper, iron, nickel, gold, silver, aluminum, tungsten, molybdenum, platinum, etc. The adhesive composition or the film adhesive of the present invention is capable of hot-pressing at relatively low temperature, and develops sufficient adhesive strength simply by performing post-cure at relatively low temperature for a short time. Therefore, it is suited to adhesion of adherends having relatively low heat resistance.

In the preparation of the adhesive composition of the present invention, polymerization process using monomers as starting material is not included. Therefore, unreacted monomer residue remaining in the composition or volatile organic substance derived from monomers can be reduced as much as possible. Thus, foaming due to volatile component generated at the time of solder reflow, or generation of smell of monomers that is relatively uncomfortable to users can be effectively prevented. On the other hand, the adhesive composition of the present invention can be used as an adhesive tape capable of being hot-pressed if the composition is used as adhesive layer bonded to a base material such as polymer film, fiber cloth, metal foil, etc. The adhesive composition of the present invention can be used not only for adhesive application, but also as a seal material.

EXAMPLES

The present invention will be further described with reference to examples below. It is to be understood that the present invention is not restricted by these examples.

Starting Components

In these examples, following adhesive components were used for preparation of the adhesive composition. In Table 1 below, for simplicity, reference is made to trade names as described below in place of explanation of chemical names.

Ethylene-glycidyl (meth)acrylate copolymer, MFR: 300 g/10 minutes, Trade name: "Bondfast CG5001", manufactured by Sumitomo Chemicals Co.

LDPE, MFR: 70 g/10 minutes, Trade name: "Mirason FL60", manufactured by Mitsui Chemicals Co.

Ethylene-α-olefin copolymer, MFR: 30 g/10 minutes, Trade name: "Engage8407", manufactured by Dupont Dow Co.

Acrylic acid modified rosin, acid value: 240 mg KOH/g, Trade name: "KE604", manufactured by Arakawa Chemical Industries Co. 4-hydroxybenzophenone, (4HBP) manufactured by Tokyo Kasei Kogyo Co.

Examples 1 to 3

Adhesive components were charged into a mixer (manufactured by Brabender Co.) in the blending ratio (parts by weight) as shown in Table 1 below, and kneaded homogeneously. Kneading conditions were: 120° C., 30 rpm, and 10 minutes. The resulting block-like kneaded product was sandwiched between two polyester films, and was pressed at 130° C. to prepare following two types of film adhesive:

(1) film adhesive, of 300 μm in thickness, for measuring electrical properties, (2) film adhesive, of 30 μm in thickness, for measuring adhesive strength.

Next, one polyester film was peeled off from the film adhesive sandwiched between two polyester films, and the exposed film adhesive was irradiated with ultraviolet (UV) radiation. The UV irradiation apparatus used was: Trade name, "Unicure UVC 183" (manufactured by USHIO Co.), and irradiation condition was: 80 W/cm$^2$ and 6000 mJ/cm$^2$.

Evaluation Test I

Using the film adhesive with polyester film fabricated as described above, electrical properties and adhesive strength were measured in accordance with following procedure.

(1) Measurement of Electrical Properties

In these Examples, electrical properties of the film adhesive were measured with respect to dielectric constant, ϵ, and dielectric loss, tangent δ.

Exposed surface of a film adhesive supported by a polyester film on the other surface was covered with a polyester film again, and the laminate of three layers consisting of polyester film/film adhesive/polyester film was post-cured at 150° C. for 2 hours.

After the polyester films were peeled off from the film adhesive, dielectric constant, ϵ, and dielectric loss tangent, δ, at 1 GHz at room temperature were measured using the "Electrode for measuring dielectrics, Model HP16451A" (manufactured by Hewlett-Packard Co.) and "Impedance analyser, Model 4192A" (manufactured by Hewlett-Packard Co.). Measurement results shown in Table 1 below were obtained.

(2) Measurement of Adhesive Strength

Two rectangular samples of size 10 mm×30 mm were cut out from the film adhesive. The samples were placed on a copper plate (length 30 mm×width 25 mm×thickness 500 μm) with the adhesive surface facing downward, and were laminated at 120° C.

After the polyester film covering the film adhesive was peeled off, polyimide film of 50 μm in thickness cut out in size 10 mm×100 mm was superimposed on the film adhesive, and hot-pressed at 200° C. and 5 N (Newton)/cm$^2$ for 20 seconds. A laminate of three layers consisting of copper plate/film adhesive/polyimide film was formed, and was post-cured at 150° C. for 2 hours.

The laminate after post-cure was mounted to a tensile testing apparatus (Trade name, "RTM100", manufactured by Toyo Baldwin Co.), and 90 degrees peel strength (interface peel strength between the polyimide film and the film adhesive) was measured at stretching rate of 50 mm/minute. Maximum measured value was taken as the peel adhesive strength. Measurement results plotted in graph a in appended FIG. 1 were obtained (initial adhesive strength).

Next, to measure the heat resistance performance of the film adhesive, the laminate fabricated as described above after post-cure was placed in an oven at 125° C., and heat treated for 168 hours. 90 degrees peel strength was measured on the laminate after the heat treatment using same procedure as described above, and measurement results plotted in graph b in the appended FIG. 1 were obtained (adhesive strength after 168 hours).

In Example 2, the laminate fabricated as described above after post-cure was placed in an oven at 125° C., and heat treated for 500 hours. 90 degrees peel strength was measured on the laminate after the heat treatment using same procedure as described above, and measurement results plotted in graph c in the appended FIG. 1 were obtained (adhesive strength after 500 hours).

Evaluation Test II

The film adhesive with polyester film fabricated in Example 2 was used to measure solder heat resistance (heat resistant adhesive strength) in accordance with following procedure.

Two rectangular samples of size 10 mm×30 mm were cut out from the film adhesive. This sample was placed on a copper plate (length 30 mm×width 25 mm×thickness 500 µm) with the adhesive surface facing downward, and was laminated at 120° C.

After the polyester film covering the film adhesive was peeled off, copper foil of 18 µm in thickness cut out in size 10 mm×100 mm was superimposed on the film adhesive, and hot-pressed at 200° C. and 5 N (Newton)/cm$^2$ for 20 seconds. A laminate of three layers consisting of copper plate/film adhesive/copper foil was formed, and was post-cured at 150° C. for 2 hours.

The laminate after post-cure was mounted to a tensile testing apparatus (Trade name, "RTM-100", manufactured by Toyo Baldwin Co.), and 90 degrees peel strength (interface peel strength between the copper foil and the film adhesive) was measured at stretching rate of 50 mm/minute. Maximum measured value was taken as the peel adhesive strength. 90 degrees peel adhesive strength of 6.2 N/cm was obtained (initial adhesive strength).

Then, in order to measure solder heat resistance of the film adhesive, the laminate fabricated as described above after post-cure was placed on a hot plate at 260° C. with the copper plate on the lower side, and was heat-treated for 30 seconds. 90 degrees peel strength was measured on the heat-treated laminate, and 90 degrees peel adhesive strength of 7.9 N/cm was obtained (adhesive strength after heat treatment). It can be seen that the film adhesive can sustain good adhesive strength even when subjected to high temperature corresponding to solder reflow.

Comparative Example 1

The same procedure as in above-described Example 1 was repeated, but in this example, for comparison purpose, the ethylene-α-olefin copolymer (Trade name, "Engage8407") was omitted and blended amount of low density polyethylene (Trade name, "Mirason FL60") was changed from 45 parts by weight to 60 parts by weight, as described in Table 1 below.

As in Example 1 above, electrical properties and adhesive strength were measured, and measurement results were obtained as shown in Table 1 below and plotted in FIG. 1. In FIG. 1, graph "a" shows the initial adhesive strength, and graph "b" shows the adhesive strength after 168 hours.

TABLE 1

| | Component of adhesive composition (parts by weight) | | | | | Electrical properties | |
|---|---|---|---|---|---|---|---|
| Example No. | CG5001 | FL60 | Engage8407 | KE604 | 4HBP | dielectric constant | dielectric loss tangent |
| Example 1 | 30 | 45 | 15 | 2.1 | 0.5 | 2.45 | 0.010 |
| Example 2 | 30 | 30 | 30 | 2.1 | 0.5 | 2.42 | 0.010 |
| Example 3 | 30 | 15 | 45 | 2.1 | 0.5 | 2.39 | 0.010 |
| Comparative Example 1 | 30 | 60 | — | 2.1 | 0.5 | 2.44 | 0.010 |

As can be seen from the measurement results shown in the Table 1 above, all examples exhibited good electrical properties (low dielectric constant and low dielectric loss tangent).

As can be seen from the measurement results plotted in FIG. 1, in the case of adhesive composition as shown in Example 1 to 3 in which low density polyethylene and ethylene-α-olefin copolymer are contained simultaneously, measured adhesive strength after post cure was 10 N/cm or higher, and is satisfactory. Measured adhesive strength after heat treatment at 125° C. for 168 hours to evaluate heat resistance, was 5 N/cm or higher, and is also satisfactory. Adhesive strength after heat treatment at 125° C. for 500 hours was comparable to the adhesive strength after heat treatment at 125° C. for 168 hours, and is also satisfactory. In contrast to these satisfactory adhesive strengths, in the case of Comparative example 1, the adhesive strength exhibited significant degradation after post cure.

What is claimed is:

1. A heat-curable adhesive composition comprising:
   an ethylene-glycidyl (meth)acrylate copolymer;
   a low density polyethylene;
   an ethylene-α-olefin copolymer; and
   a heat curing agent for said ethylene-glycidyl (meth)acrylate copolymer, wherein said heat curing agent comprises a rosin having a carboxyl group in the molecule.

2. The heat-curable adhesive composition of claim 1, wherein the minimum density of said low density polyethylene is at least about 0.910 as measured according to ASTM D1248-84.

3. The heat-curable adhesive composition of claim 1, wherein the maximum density of said low density polyethylene is up to about 0.925 as measured according to ASTM D1248-84.

4. The heat-curable adhesive composition of claim 1, wherein, in said ethylene-α-olefin copolymer, the polymerization ratio of ethylene to α-olefin is from about 90:10 to about 10:90.

5. The heat curable adhesive composition of claim 1, wherein the minimum density of said ethylene-α-olefin copolymer is about 0.850 as measured according to ASTM D1248-84.

6. The heat curable adhesive composition of claim 1, wherein the maximum density of said ethylene-α-olefin copolymer is up to about 0.909 as measured according to ASTM D1248-84.

7. The heat-curable adhesive composition of claim 1, wherein said film has a thickness from about 5 to about 80 μm.

8. The heat-curable adhesive composition of claim 1, wherein, after post-curing, the composition has a dielectric constant of about 2.5 or less, and a dielectric loss tangent of about 0.015 or less when measured at the frequency of about 1 GHz.

* * * * *